(12) United States Patent
Bochan et al.

(10) Patent No.: US 6,803,004 B1
(45) Date of Patent: Oct. 12, 2004

(54) HIGH THROUGHPUT PROCESS FOR REACTIVE EXTRUSION OF EPOXY RESIN

(75) Inventors: Alan Bochan, Aliquippa, PA (US); Thomas R. Mallen, Zelienople, PA (US); Mike A. Lucarelli, McMurray, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 154 days.

(21) Appl. No.: 10/042,787

(22) Filed: Oct. 24, 2001

Related U.S. Application Data
(60) Provisional application No. 60/242,821, filed on Oct. 24, 2000.

(51) Int. Cl.[7] .................................................. B27C 47/80
(52) U.S. Cl. ............................. 264/211.24; 264/211.23; 264/331.21; 528/89
(58) Field of Search ........................ 264/176.1, 211.23, 264/211.24, 331.21, 349; 528/89, 365, 374

(56) References Cited

U.S. PATENT DOCUMENTS

| | | |
|---|---|---|
| 4,612,156 A | 9/1986 | Heinemeyer et al. |
| 4,732,958 A | 3/1988 | Jackson et al. |
| 5,310,854 A | 5/1994 | Heinmeyer et al. |
| 5,401,814 A | 3/1995 | Schomaker et al. |

OTHER PUBLICATIONS

Brennan et al., "High–Barrier Poly(hydroxy amide ethers): Effect of Polymer Structure on Oxygen Transmission Rates," *Macromolecules*, 1998, 31:2622–2630.

*Primary Examiner*—Mathieu D. Vargot
(74) *Attorney, Agent, or Firm*—Fish & Richardson P.C., P.A.

(57) ABSTRACT

The present invention provides low cost resins (e.g., advanced epoxy resins), processes for making these resins, and coatings made with theses resins. Specifically, the present invention provides high throughput extrusion processing of advanced epoxy resins using an appropriate amount of an iminium salt catalyst. Preferred iminium salt catalysts are stable at room temperature in the reaction mixture (thereby enabling the pre-mixing of ingredients and the stable storage of the pre-mixed ingredients) and yet are highly efficient at the processing temperatures described herein. An example of one such advance epoxy resin is the reaction product of diglycidyl ether of bisphenol A with bisphenol A in the presence of an iminium salt catalyst. Preferred processes are performed using no solvent or only negligible amounts of solvent. One preferred extrusion process utilizes an intermeshing co-rotating twin-screw extruder, however, other types of extruders may alternatively be employed.

17 Claims, No Drawings

HIGH THROUGHPUT PROCESS FOR REACTIVE EXTRUSION OF EPOXY RESIN

CROSS REFERENCE TO RELATED APPLICATION

Under 35 USC §119(e)(1), this application claims the benefit of prior U.S. provisional application No. 60/242,821, filed Oct. 24, 2000.

FIELD

The present invention relates to the high throughput extrusion processing of advanced epoxy resins and coating compositions containing same.

BACKGROUND

Packaging coatings (e.g., for the interior of beverage cans and the like) previously have been formulated from advanced epoxy resins. For such purposes, it is desirable for the coating composition to have both good dry adhesion and wet adhesion properties.

Traditionally, batch processes have been used for the preparation of advanced epoxy resins. Unfortunately, however, these processes are expensive. They also unfortunately require the use of large amounts of solvent that poses manufacturing and potential environmental concerns.

Attempts have been made previously to process advanced epoxy resins using extruders. U.S. Pat. Nos. 4,612,156 and 5,310,854 describe two such attempts. Unfortunately, however, the methods disclosed in these patents have been found to yield inefficient throughput and, hence, are expensive to operate.

From the foregoing, it will be appreciated that what is needed in the art is a more efficient process that avoids the need for large amounts of solvent and that has high efficiency and throughput. Such methods for preparing advanced epoxies are disclosed and claimed herein.

SUMMARY

In one embodiment, this invention relates to novel processes for preparing an advanced epoxy material. The process preferably comprises the steps of: continuously providing to an extruder: (i) an epoxy resin having an average of more than one vicinal epoxy group per molecule; (ii) a linking material having attached thereto an average of more than one moiety reactive with the vicinal epoxy group of the epoxy resin; and (iii) a catalytic amount of at least one iminium salt catalyst for promoting the reaction between the epoxy resin and the linking material; operating the extruder at a sufficient temperature (typically greater than 200° C.) to cause a reaction between the epoxy resin and linking material for a sufficient residence time to produce an advanced epoxy resin; and continuously removing the produced advanced epoxy resin from the extruder.

In preferred embodiments the iminium salt catalyst has the general formula

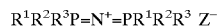

wherein each $R^1$, $R^2$ and $R^3$ is independently an aromatic, inertly substituted aromatic, aliphatic, cycloaliphatic, inertly substituted aliphatic, or inertly substituted cycloaliphatic group; and Z is any suitable anion. In most preferred embodiments the catalyst is a bis(triphenylphosphine) iminium salt.

Definitions

As used herein, the term "hydrocarbyl" means any aliphatic, cycloaliphatic, aromatic, aryl substituted aliphatic or cycloaliphatic, or aliphatic or cycloaliphatic substituted aromatic groups. The aliphatic groups can be saturated or unsaturated.

As used herein, the term "hydrocarbyloxy" means a hydrocarbyl group having an oxygen linkage between it and the carbon atom to which it is attached.

As used herein, the "reaction time" for an extruder process equals the average residence time a unit mass of material at steady state spends in the reaction section of the extruder.

DETAILED DESCRIPTION

The present invention provides low cost resins (e.g., advanced epoxy resins), processes for making these resins, and coatings made with these resins, that solve one or more of the unmet needs noted above. Specifically, it has been discovered that high throughput extrusion processing of resins (e.g., advanced epoxy resins) can be achieved by using an appropriate amount of an iminium salt catalyst as disclosed herein. Preferred iminium salt catalysts are stable at room temperature in the reaction mixture (thereby enabling the pre-mixing of ingredients and the stable storage of the pre-mixed ingredients) and yet are highly efficient at the processing temperatures described herein.

In one embodiment, the present invention relates to the extrusion processing of advanced epoxy resins. An example of one such advanced epoxy resin is the reaction product of diglycidyl ether of bisphenol A (e.g., EPON 828, available from Dow Chemical Company) with bisphenol A ("BPA") in the presence of an iminium salt catalyst as herein described. The extrusion process may utilize solvents in addition to the reactants. However, preferred processes are performed using no solvent or only negligible amounts of solvent (e.g., a small amount of solvent may be used to facilitate delivery of the catalyst component). One such extrusion process utilizes an intermeshing co-rotating twin-screw extruder. Other types of extruders may alternatively be employed.

Compositions of the present invention may be prepared, for example, by reacting an epoxy resin with a linking material such as a dihydric phenol. The ingredients are preferably provided in the proper proportions so as to produce a product having (i) an epoxide equivalent weight (EEW) of preferably from about 200 to about 50,000, more preferably from about 500 to about 25,000, and most preferably from about 700 to about 10,000; and/or (ii) a weight average molecular weight preferably from about 400 to about 200,000, more preferably from about 1,000 to about 100,000, and most preferably from about 5,000 to about 90,000. The proper proportion of ingredients generally depends upon the particular epoxy resin and dihydric phenol being utilized. Typically, however, the components are employed in amounts which provide a ratio of aromatic hydroxyl groups to epoxide groups preferably from about 0.01:1 to about 5:1, more preferably from about 0.1:1 to about 2:1, and most preferably from about 0.3:1 to about 1.1:1, with the proviso that ratios of between about 0.96:1 to 1.04:1 should be avoided so as to avoid undesirable gellation in situations when the reaction goes to completion.

The advanced epoxy resin can be terminated in epoxide or hydroxyl groups or both, depending upon the ratio of aromatic hydroxyl groups to epoxy group.

The extrusion reaction is conducted at temperatures of preferably greater than about 200° C., more preferably greater than about 220° C., and most preferably greater than about 240° C. for a residence time sufficient to produce the desired product. The upper range of temperature should be set below that temperature which causes degradation of the reactants or resultant product. Typically, the reaction is run at a temperature of about 260° C. At temperatures above about 350° C., the product may form undesirable gels or decompose. At temperatures below 200° C., the product may solidify or not react quickly enough.

In general, higher reaction temperatures require less time to produce the desired product than do lower reaction temperatures. Particularly suitable reaction times range between about 0.01 to about 0.5 hours, more preferably from about 0.01 to about 0.2 hours, and most preferably from about 0.01 to about 0.06 hours.

Suitable compounds having an average of more than one vicinal epoxy group per molecule which can be employed in the present invention include, for example, glycidyl esters of compounds having an average of more than one carboxyl group per molecule and glycidyl ethers of compounds having an average of more than one aromatic hydroxyl group per molecule.

Particularly suitable glycidyl ethers include, for example, those represented by the following formulas I or II:

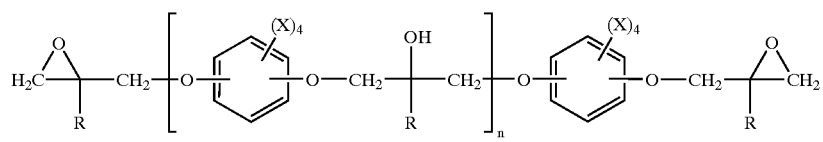

Formula I

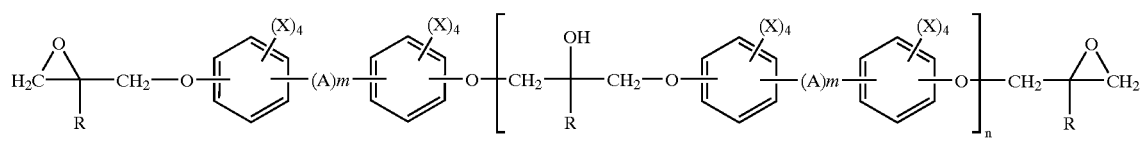

Formula II wherein
- each A is independently a divalent hydrocarbyl group (having preferably from 1 to 20, more preferably from 1 to 10, and most preferably from 1 to 6 carbon atoms);
- each X is independently hydrogen, a hydrocarbyl or hydrocarbyloxy group (having preferably from 1 to 20, more preferably from 1 to 10, and most preferably from 1 to 6 carbon atoms), or a halogen atom (preferably chlorine or bromine);
- each m independently has a value of 0 or 1;
- each n has a value preferably from 0 to about 100, more preferably from 4 to 50, and most preferably from 10 to 35; and
- each R is independently hydrogen, a hydrocarbyl or hydrocarbyloxy group (having preferably from 1 to 20, more preferably from 1 to 10, and most preferably from 1 to 6 carbon atoms), or a halogen atom.

Particularly suitable epoxy-containing compounds include, for example, diglycidyl ethers of biphenol (e.g., bisphenol A, bisphenol F, bisphenol K, and bisphenol S), and halogenated (e.g., brominated) derivatives thereof.

Suitable compounds having an average of more than one aromatic hydroxyl group per molecule include, for example, the bisphenols and diphenols represented by the following formulas III or IV:

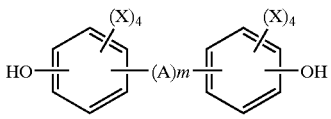

Formula III

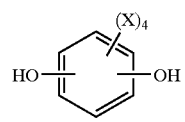

Formula IV wherein each A, X and m are as defined above.

Particularly suitable aromatic hydroxyl group containing compounds include, for example, biphenol, bisphenol A, bisphenol F, bisphenol K, bisphenol S, and halogenated (particularly brominated) derivatives thereof.

As previously mentioned, the extrusion process may be carried out neat (i.e., at 100% solids) or with an optional solvent. Neat reactions (or reactions with negligible amounts of solvent) are generally preferred in circumstances where the solvent would not be included in the final product. In one preferred embodiment, the reaction is essentially neat, with a small amount of solvent (based on the total mass of reactants) being used to facilitate metering and/or delivery of the catalyst to the reactor.

Suitable solvents which can be employed in the compositions and process of the present invention include, for example, glycol ethers, alcohols, ketones, acetates, aromatic hydrocarbons, etc., and combination thereof. The solvent may be used to lower the viscosity of the extrudate or to facilitate delivery of one or more of the reactants or both. Particularly suitable solvents include, for example, acetone, methyl ethyl ketone (MEK), methyl isobutyl ketone, methyl amyl ketone, diacetone alcohol, methanol, methyl ether of dipropylene glycol, 3-methyl-3-methoxy butanol, n-butanol, sec-butanol, isopropanol, butyl acetate, toluene, xylene, and combinations thereof.

Suitable catalysts that can be employed to prepare the compositions of the present invention include, for example, iminium salt catalysts. Some suitable iminium salt catalysts include those catalysts represented by the general formula

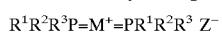

wherein
M is N or P, preferably N;

each $R^1$, $R^2$ and $R^3$ is independently an aromatic, inertly substituted aromatic (e.g., aliphatic or cycloaliphatic substituted aromatic), aliphatic (e.g., $C_1$–$C_{10}$ alkyl), cycloaliphatic, inertly substituted aliphatic (e.g., aryl substituted aliphatic), or inertly substituted cycloaliphatic (e.g., aryl substituted cycloaliphatic) group; and Z is any suitable anion.

Preferably, at least one $R^1$, $R^2$ and $R^3$ group per phosphorous atom is aromatic.

Particularly suitable such catalysts include: bis (trihydrocarbylphosphine) iminium salts (also known as bis(trihydrocarbylphosphoranylidene) ammonium salts), bis (triphenylphosphine)iminium salts (e.g., bromide or chloride salts) (also known as bis(triphenylphosphoranylidene) ammonium bromide or chloride or as μ-nitrido-bis (triphenylphosphorus)(1+) bromide or chloride); bis[tris (dihydrocarbylamino)phosphine]iminium salts (also known as bis[tris(di-hydrocarbylamino) phosphoranylidene] ammonium salts); and tetrakis[tris(dihydro-carbylamino) phosphoranylideneamino]phosphonium salts.

Preferred catalysts include, but are not limited to, bis (triphenylphosphine) iminium salts (e.g., chloride, iodide, bromide, acetate, formate, phosphate, borate, trifluoracetate, oxalate, bicarbonate, and conjugate base of mono- and dihydric phenols, such as phenol and bisphenol A). Most preferred catalysts are bis(triphenylphosphine)iminium chloride and acetate.

A wide variety of suitable anions may be employed in the present invention. The choice of anion will generally be made depending on desired reaction rate and reaction temperature. Particularly suitable anions include, for example, halides (e.g., chloride, bromide or iodide); carboxylates (e.g., formate, acetate, oxalate, trifluoroacetate, carboxylate); carboxylic acid complexes (e.g., acetate.acetic acid complex); phosphates, borates, conjugate bases of inorganic acids (e.g., bicarbonate tetrafluoroborate or biphosphate); and conjugate bases of phenols (e.g., phenate) or an anion derived from a bisphenol or biphenol (e.g., bisphenol A or bisphenol F). Combinations of different anions also may be used, if desired. The most preferred anions are halides, with chloride being the most preferred halide.

Pure bis(tripenylphosphine)iminium chloride is available commercially from Alfa Chemicals. The preparation of such salts is known in the art. For example, bis(phosphine) iminium chlorides can be prepared by the reaction of a tris(hydrocarbyl)phosphine dichloride with hydroxylamine hydrochloride and the corresponding tris(hydrocarbyl) phosphine. This preparation is described for bis (triphenylphosphine)iminium chloride in *Inorganic Synthesis*, vol. 15, pp. 84–87 (1974).

The catalyst is employed in any amount that satisfactorily catalyzes the reaction between the bisphenol and the epoxy resin. Preferred amounts of catalyst include from about 0.01 to about 3 weight percent of catalyst based on the combined weight of the reactants, more preferably from about 0.03 to about 2 weight percent, most preferably from about 0.04 to about 1 weight percent, and optimally from about 0.05 to about 0.4 weight percent of catalyst based on the combined weight of the reactants.

The advanced resins are suitably prepared with the aforementioned catalysts using a suitable extruder process (including, for example, the processes described generally by Heinemeyer et al. in U.S. Pat. Nos. 4,612,156 and 5,310,854). More preferred extruder conditions and set-ups are described herein.

If desired, the coating compositions of the present invention may optionally include curing agents to assist in subsequent curing. Suitable curing agents which can be employed in the coating compositions of the present invention include, for example, phenol-aldehyde resole resins, urea-aldehyde resins, melamine-aldehyde resins, polyamides, acid anhydrides, primary, secondary and tertiary amines, imidazoles, guanadines, any combination thereof and the like. Particularly suitable curing agents include, for example, melamine-formaldehyde resins, phenolformaldehyde resole resins, urea-formaldehyde resins, polyamides, any combination thereof and the like.

The curing agents are employed in amounts that are sufficient to satisfactorily cure the composition. Usually preferred amounts include from about 0.1 to about 50, more preferably from about 1 to about 30, and most preferably from about 10 to about 25, moles of curing agent per epoxide group is sufficient to cure the composition.

The coating compositions of the present invention may contain, in addition to the advanced epoxy resin, solvent and curing agents, other adjuvants (e.g., chain terminators, fillers, pigments, dyes, flow control agents, leveling agents, antioxidants, and the like). These additional adjuvents are employed in functionally equivalent amounts, i.e. an amount which is suitable to produce the desired effect.

Suitable chain terminators which can be employed herein, so as to control the molecular weight of the advanced epoxy resin include, for example, monofunctional phenolic compounds, carboxylic acids, aromatic or aliphatic secondary amines, mercaptans, isocyanates, isothiocyanates, epoxy compounds, mixtures thereof and the like.

Suitable monohydric phenolic compounds include, for example, those represented by the formula:

Formula V

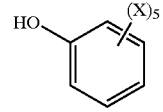

wherein each X is as hereinbefore described. Suitable monocarboxylic acids include those aliphatic saturated or unsaturated carboxylic acids having from about 2 to about 20 carbon atoms (e.g., ethanoic acid, propionic acid, benzoic acid, 2-phenanthrene carboxylic acid, stearic acid, talloil acid, etc.). Suitable monoisocyanates include methylisocyanate, ethylisocyanate, a-naphthalisocyanate, tertiary butylisocyanate, para-tolylisocyanate, phenylisocyanate, etc. Suitable monoisothiocyanates include methylisothiocyanate, ethylisothiocyanate, isopropylisothiocyanate, phenylisothiocyanate, etc. Suitable monomercaptans include octyl, dodecyl, ethyl, propyl, butyl, benzyl, mercaptans, etc. Suitable monoepoxy compounds include ethylene oxide, propylene oxide, butl glycidyl ether, octyl glycidyl ether,etc.

Particularly suitable chain terminators include phenol, p-tertiary butyl phenol, nonyl phenol, stearic acid, talloil acid, octyl and dodecyl mercaptans, butyl glycidyl ether, octyl glycidyl ether, and phenyl isocyanate.

Vinyl ester resins can be prepared by the processes of the present invention by employing as chain terminator a monocarboxylic unsaturated acid such as, for example, sorbic acid, acrylic acid, methacrylic acid and the like. In this instance, the acid preferably would be added to the extruder at the point at which the desired product from the reaction of epoxy resin and dihydric phenol has been achieved.

Alternatively, the resin's molecular weight may be increased by "upgrading" the resin using a multi-functional acid material. For example, an upgraded resin may be prepared by reacting between 0.1 and 10 equivalents (preferably two) of an advanced epoxy with one equivalent of adipic acid. Other multifunctional acids (e.g., diacids) or mixtures of acids may be employed if desired.

Generally, the optional chain terminator and/or the optional multifunctional acid material may be added to the resin during or after the advancement process and in any combination.

A presently preferred extruder set up is described as follows: a Werner & Pfleiderer ZSK—25 fully intermeshing co-rotating twin-screw extruder was used.

The extruder barrel is 1325 millimeters in length excluding the die. The extruder barrel has an internal diameter of 25 millimeters making the length to diameter ratio of 52/1. The barrel section is modular, and consists of 13 barrel sections, and a die plate. Within these 13 sections, there are two open feed ports located at barrels #1 and #2 respectively. The twin screws are configured with forward conveyance elements of various pitch dimensions. The screw length is 1324 millimeters excluding the screw tips. It should be noted that the screws do not extend into the die section of the barrel. The barrel is divided into 8 heating and cooling zones excluding the die head. The zones are electrically heated and water-cooled. The die head is the ninth zone and is electrically heated only. A temperature controller is used to control the barrel temperature of each zone. The melt temperature can be measured at the exit of the die.

Since the reaction is dependent upon catalyst, temperature and time, the extruder length is important with regard to residence time, which depends upon the temperature, catalyst, throughput of the reactants and extruder length. The residence time can be affected by changes of the screw configuration, i.e., screw elements that hinder flow will increase residence time and conversely, screw elements that accelerate flow will decrease residence time. Screw elements with back mixing capability and elements with more flight revolutions per given screw length are examples of screw configurations that increase residence time. Screw elements with fewer screw flight revolutions per given screw length decrease the residence time. Screw speed also affects residence time. At slower speeds (rpm) the residence time increases and conversely at higher speeds the residence time decreases. All the factors effecting residence time are considered in developing an optimized screw configuration to give the specific desired reaction of the raw materials.

Although any extruder would be suitable in the process of the present invention over a short period of time, it is preferred, so as to prevent build-up on the screw(s), to employ and extruder having a multiplicity of self-wiping or self-cleaning screws. An inteflleshing multi-screw extruder is preferred to be employed in the present invention, due to the screws and the walls of the extruder being continuously wiped so that there is little or no chance for build-up on the walls of the extruder or behind the flights of the screws as could occur on single screw extruders. This continuous wiping action of the wall and screws also contributes to better mixing which is beneficial to encourage the desired reaction between the reactants. In a reaction between phenolic hydroxyl groups and epoxy groups, good mixing is preferred so as to encourage the desired phenolic hydroxyl/epoxy reaction over possible competing alcoholic or aliphatic hydroxyl/epoxy reactions. The higher the molecular weight becomes, more alcoholic hydroxyls become available and less phenolic hydroxyls remain; therefore, the mixing becomes more and more desirable as well as more difficult due to the increase in viscosity. This problem is handled quite adequately by an intermeshing multi-screw extruder with a screw designed for good mixing throughout the full length of the extruder.

The advanced epoxy resins produced by the present process can be formed upon exiting from the extruder into a variety of shapes and/or profiles. For example, the extrudate may be chopped into pellets, flaked, ground, formed into sheets, etc. The advanced epoxy resins produced by the present process have wide utility in a variety of end uses, including, for example, as components of coating compositions. Such coating compositions of the present invention can be applied to substrates such as tin, steel, aluminum, wood, plastic, paper, and the like.

The following examples are offered to aid in understanding of the present invention and are not to be construed as limiting the scope thereof. Unless otherwise indicated, all parts and percentages are by weight.

EXAMPLES

For Examples 1 to 3 the following procedures were followed.

Epoxy/catalyst preparation

An epoxy reactant (e.g., EPON 828 for Examples 1–3) was heated in a glass reaction vessel with stirred agitation to 105° C., and held at this temperature for at least 1 hour to remove excess water from the reactant. The reactant was then cooled and maintained at 90° C. It is at this temperature that the catalyst solution was introduced into the reactant. A catalyst solution was prepared by dissolving a catalyst (e.g., BisTPH for Examples 1 and 2) into equal portions weight/weight solvent (e.g., methanol for Examples 1 and 2). The catalyst solution was added to the hot (90° C.) epoxy reactant under stirred agitation. If desired, the solvent may be flashed off during the addition step. In the case of Comparative Example 3 the catalyst was supplied at a 70% concentration in MeOH.

Extruder Process Section Parameters

The catalyzed epoxy, and a linking material (e.g., BPA) were added simultaneously to the feed section of the extruder. There are two feed ports located at barrel sections #1 and #2, respectively. The solid linking material was fed into the feed port located at barrel section #1 via a volumetric feeder. The feed may alternatively be controlled gravimetrically. The catalyzed epoxy liquid was fed into the feed port located at barrel section #2 via a gear pump. The catalyzed epoxy liquid was fed to the gear pump from a heated (80–90° C.), pressurized vessel (68.9 kPa nitrogen) to facilitate pumping. The barrel temperature profile was controlled to keep the melt temperature at 260° C., and the screw speed (325 RPM) maintained to maximize both throughput and residence time.

| | |
|---|---|
| Zone 1: | 240 or 260° C. |
| Zone 2: | 240 or 260° C. |
| Zone 3: | 240 or 260° C. |
| Zone 4: | 240 or 260° C. |
| Zone 5: | 240 or 260° C. |
| Zone 6: | 240 or 260° C. |
| Zone 7: | 240 or 260° C. |
| Zone 8: | 240 or 260° C. |
| Zone 9: | 180° C. Die Head |

Example 1

A BisTPH catalyzed advanced epoxy resin was processed at a throughput rate of 11.8 kg per hour. The charge to the extruder was as follows:

| Catalyzed EPON 828: | 7.7 kg per hour |
| --- | --- |
| BPA: | 4.1 kg per hour |

The barrel temperature profile was controlled to keep the melt temperature at 240° C., and the screw speed (250 RPM) maintained to maximize both throughput and residence time. The die head temperature was 180° C., with a single port opening. For this Example the total amount of catalyst equaled 0.1 wt. % based on the total weight of reactants. The extrudate was collected, air cooled, and crushed for analysis. The extrudate yielded in range (0.038–0.041) epoxy values (i.e., epoxy value=equivalents of oxirane per 100 grams of resin).

Example 2

A BisTPH catalyzed advanced epoxy resin was processed at a maximum optimized throughput rate of 18.1 kg per hour. The charge to the extruder was as follows:

| Catalyzed EPON 828: | 11.8 kg per hour |
| --- | --- |
| BPA: | 6.3 kg per hour |

The barrel temperature profile was controlled to keep the melt temperature at 260° C., and the screw speed (325 RPM) maintained to maximize both throughput and residence time. The die head temperature was 180° C., with a single port opening. For this Example the total amount of catalyst equaled 0.1 wt. % based on the total weight of reactants. The extrudate was collected, air cooled, and crushed for analysis. The extrudate yielded in range (0.038–0.041) epoxy values.

Comparative Example 3

An ETPAC (ethyltriphenylphosphonium acetate) catalyzed advanced epoxy resin was processed at a maximum optimized throughput rate of 5.4 kg per hour. The charge to the extruder is as follows:

| Catalyzed EPON 828: | 3.5 kg per hour |
| --- | --- |
| BPA: | 1.9 kg per hour |

The barrel temperature profile is controlled to keep the melt temperature at 240° C., and the screw speed (200 RPM) maintained to maximize both throughput and residence time. The die bead temperature is 180° C., with a single port opening. For this Example the total amount of catalyst equaled 0.37 wt. % based on the total weight of reactants. The extrudate was collected, air cooled, and crushed for analysis. The extrudate yielded in range (0.038–0.041) epoxy values.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A process for preparing an advanced epoxy material, comprising the steps of: continuously providing to an extruder: (i) an epoxy resin having an average of more than one vicinal epoxy group per molecule; (ii) a linking material having attached thereto an average of more than one moiety reactive with the vicinal epoxy group of the epoxy resin; and (iii) a catalytic amount of at least one iminium salt catalyst for promoting the reaction between the epoxy resin and the linking material; and operating the extruder at a temperature greater than 200° C. to cause a reaction between the epoxy resin and linking material for a sufficient residence time to produce an advanced epoxy resin; and continuously removing the produced advanced epoxy resin from the extruder.

2. The process of claim 1, wherein the iminium salt catalyst has the general formula $$R^1R^2R^3P=N^+=PR^1R^2R^3 \ Z^-$$

wherein each $R^1$, $R^2$ and $R^3$ is independently an aromatic, inertly substituted aromatic, aliphatic, cycloaliphatic, inertly substituted aliphatic, or inertly substituted cycloaliphatic group; and Z is any suitable anion.

3. The process of claim 1, wherein the catalyst is a bis(triphenylphosphine) iminium salt.

4. The process of claim 2, wherein each $R^1$, $R^2$ and $R^3$ is independently an aromatic or inertly substituted aromatic group.

5. The process of claim 2, wherein Z is selected from the group consisting of halides, carboxylates, carboxylic acid complexes, conjugate bases of inorganic acids, and conjugate bases of phenols or an anion derived from a bisphenol or biphenol.

6. The process of claim 1, wherein the catalyst comprises from about 0.04 to about 1 weight percent of the combined weight of the reactants.

7. The process of claim 1, wherein the epoxy resin comprises diglycidyl ethers of biphenol and halogenated derivatives thereof.

8. The process of claim 1, wherein the linking material comprises a dihydric phenol.

9. The process of claim 1, wherein the extrudate has a weight average molecular weight from about 1,000 to about 100,000.

10. The process of claim 1, wherein the extrudate has an epoxide equivalent weight of from about 500 to about 25,000.

11. The process of claim 1, wherein the ratio of aromatic hydroxyl groups of the linking material to epoxide groups of the epoxy resin is between from about 0.01:1 to about 5:1.

12. The process of claim 1, wherein the extrusion reaction is conducted at a temperature greater than about 220° C.

13. The process of claim 1, wherein the residence time of the reactants is between about 0.01 and about 0.5 hours.

14. The process of claim 1, wherein the process further comprises continuously providing a solvent to the extruder.

15. The process of claim 1, wherein the solvent is provided in a minimal amount necessary to facilitate the delivery of the catalyst.

16. The process of claim 1, wherein the process is essentially neat.

17. The process of claim 1, further comprising the step of continuously providing to an extruder: (iv) one or more chain terminators.

* * * * *